United States Patent [19]

Ayalon

[11] Patent Number: 4,790,710
[45] Date of Patent: Dec. 13, 1988

[54] TOW TRUCK

[75] Inventor: Israel Ayalon, Ramat Hasharon, Israel

[73] Assignee: Eyal Engineering & Industrial Co. Ltd., Herzliya, Israel

[21] Appl. No.: 861,552

[22] Filed: May 9, 1986

[30] Foreign Application Priority Data

May 9, 1985 [IL] Israel ........................................ 75141

[51] Int. Cl.⁴ .............................. B60P 1/54; B60P 3/12
[52] U.S. Cl. ................................. 414/563; 280/764.1; 414/543; 414/718
[58] Field of Search ............... 414/538, 542, 543, 546, 414/550, 563, 569, 718; 280/477, 479 R, 764.1, 766.1; 212/231

[56] References Cited

U.S. PATENT DOCUMENTS

| | | | |
|---|---|---|---|
| 3,398,972 | 8/1968 | Ekengard | 280/764.1 |
| 4,111,316 | 9/1978 | Wappler | 280/764.1 X |
| 4,274,791 | 6/1981 | Moon | 414/563 |
| 4,461,490 | 7/1984 | Fritel et al. | 280/766.1 X |

FOREIGN PATENT DOCUMENTS

| | | | |
|---|---|---|---|
| 1031490 | 6/1958 | Fed. Rep. of Germany | 414/563 |
| 1655690 | 6/1970 | Fed. Rep. of Germany | 414/563 |
| 2126256 | 12/1972 | Fed. Rep. of Germany | 414/563 |
| 2650697 | 5/1978 | Fed. Rep. of Germany | 414/563 |
| 698803 | 11/1979 | U.S.S.R. | 414/563 |

Primary Examiner—Kenneth J. Dorner
Assistant Examiner—Peter R. Brown

[57] ABSTRACT

A multi-purpose recovery vehicle comprising a wheel mounted chassis, a continuously slewing crane mounted on the chassis and a recovery assembly including an extensible and retractable towing assembly, a retractable anchor assembly and a retractable stabilizer assembly mounted at a rearward end of the chassis at a location which does not interfere with the operation of the crane.

4 Claims, 9 Drawing Sheets

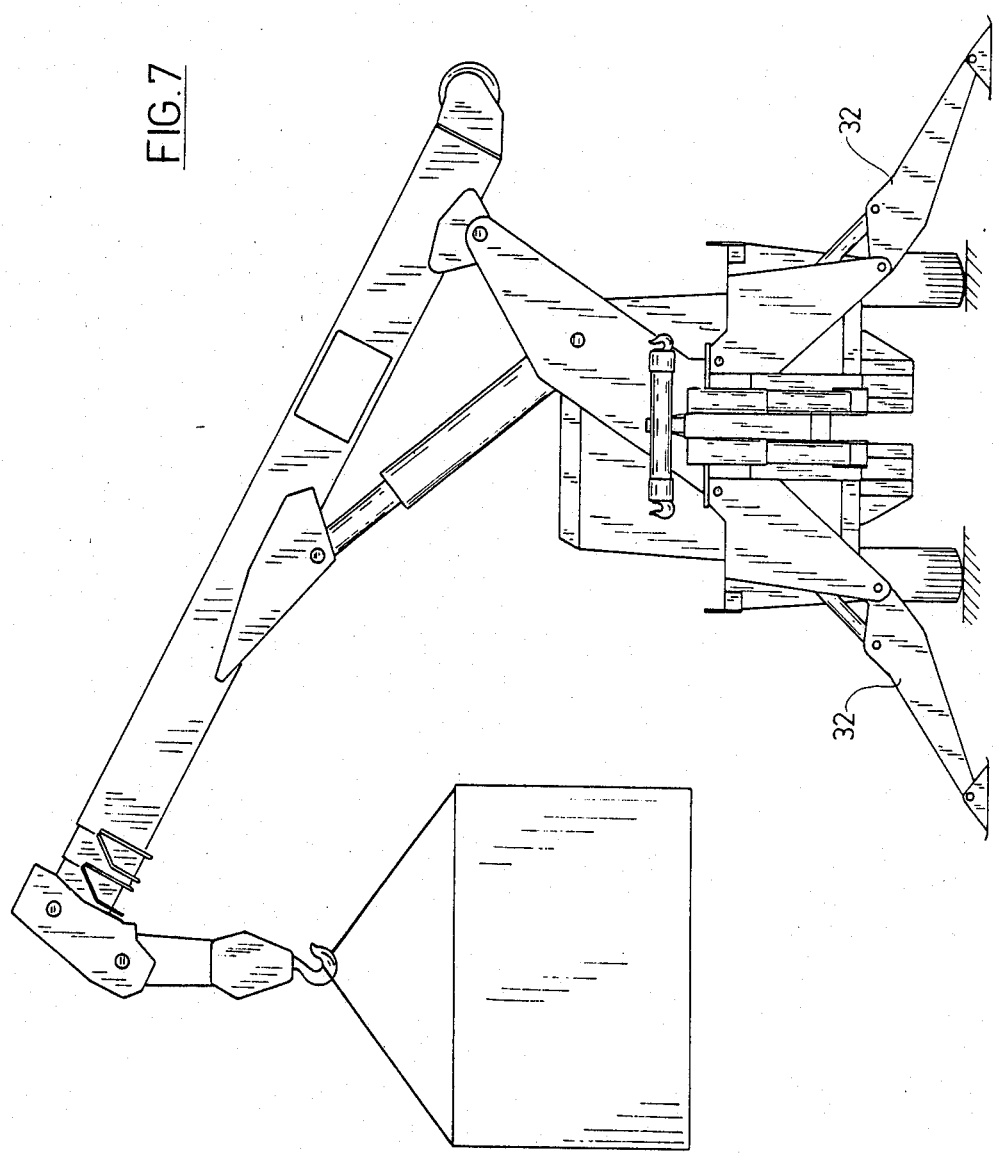

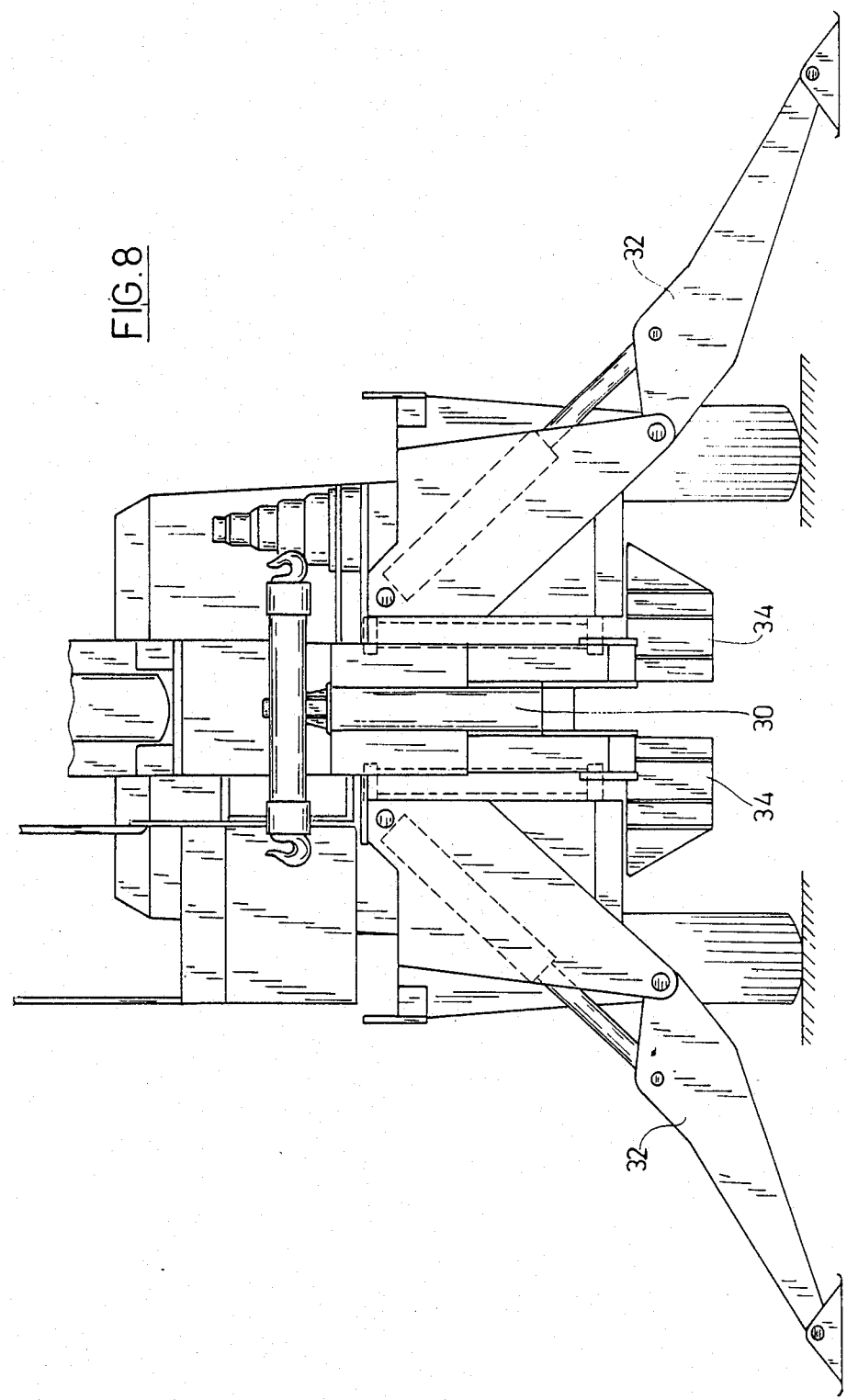

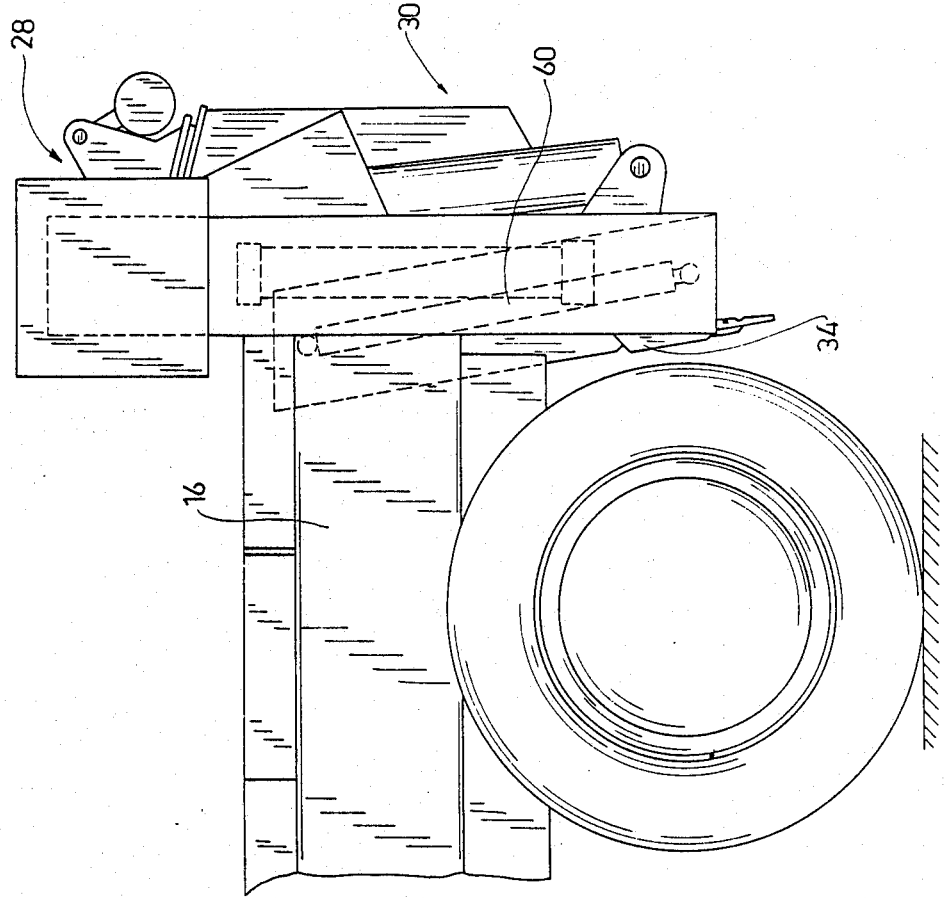

TOW TRUCK

FIELD OF THE INVENTION

The present invention relates to recovery equipment generally and more particularly to multi-purpose recovery equipment.

BACKGROUND OF THE INVENTION

Various types of recovery equipment are known in the art. Such equipment includes ordinary tow trucks, for relatively light vehicles, vehicle mounted cranes for heavy trucks, and specialized recovery vehicles for pulling vehicles from relatively inaccessible locations or orientations.

SUMMARY OF THE INVENTION

The present invention seeks to provide a multi-purpose recovery vehicle which has enhanced recovery capabilities.

There is thus provided in accordance with a preferred embodiment of the present invention a multi-purpose recovery vehicle comprising a wheel mounted chassis, a continuously slewing crane mounted on the chassis and a recovery assembly mounted at a rearward end of the chassis at a location which does not interfere with the operation of the crane.

Additionally in accordance with a preferred embodiment of the invention the recovery assembly includes an extensible and retractable towing assembly, a retractable anchor assembly, a retractable stabilizer assembly and a winch.

Further in accordance with an embodiment of the present invention the crane and the recovery assembly are arranged on the chassis so as to leave a significant portion of the chassis available for carrying loads, such as a large vehicle engine, e.g. a tank engine.

It is a particular feature of the present invention that the combination of recovery equipment provided on a single vehicle in mutually non-interfering arrangement enables a single vehicle to perform recovery, lifting and towing tasks that previously required multiple vehicles. Particularly it is a feature of the present invention that the towing assembly does not interfere with the stabilizer assembly, thus enabling full lifting operation in all azimuth directions.

BRIEF DESCRIPTION OF THE DRAWINGS

The present invention will be understood and appreciated more fully from the following detailed description, taken in conjunction with the drawings in which:

FIG. 7 is a back view illustration of the vehicle of FIG. 1 and showing the vehicle in a loading orientation having stabilizers extended;

FIG. 8 is a more detailed back view illustration of the vehicle of FIG. 7; and

FIG. 9 is a side view illustration corresponding to FIG. 2 and illustrating the arrangement of the stabilizer and anchor assemblies.

DETAILED DESCRIPTION OF A PREFERRED EMBODIMENT

Figure 1:
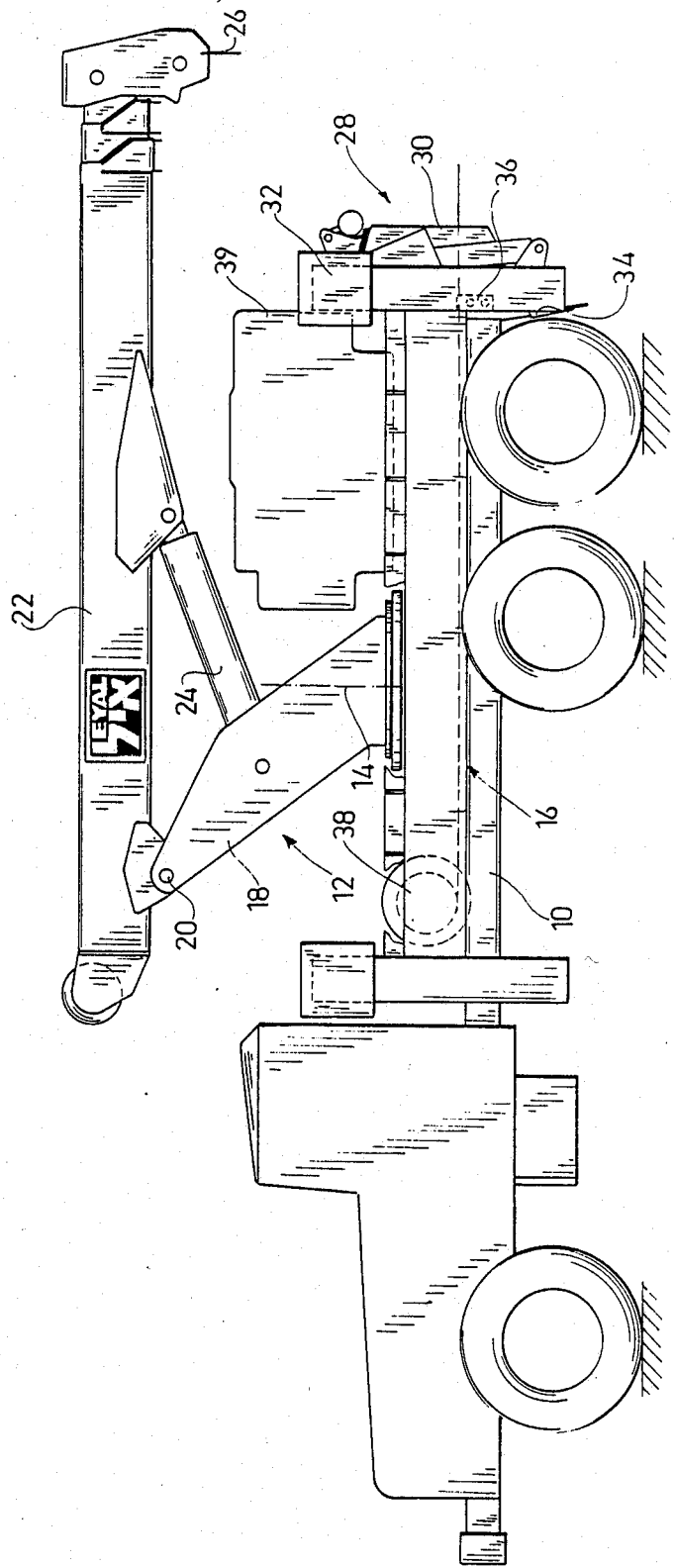
FIG. 1 is a side view illustration of the multi-purpose recovery vehicle of the present invention in a travelling orientation.

Reference is now made to FIG. 1, which illustrates a multipurpose recovery vehicle constructed and operative in accordance with a preferred embodiment of the present invention. As seen in FIG. 1, the vehicle comprises a chassis 10, which may be a conventional three axle heavy duty truck chassis. Mounted on chassis 10 is a conventional slewing crane 12, typically arranged for 360 degree slewing motion about a vertical axis 14.

Crane includes a turret 18 which defines a pivotable mounting axis 20 for an extensible arm assembly 22, which is positioned relative to turret 18 by means of a main piston and cylinder combination 24, hereinafter referred to as the main piston. The extensible arm assembly typically comprises three telescopically arranged arms having suitable piston drives, (not shown), and is provided with a winch cable 26.

Disposed rearward of and adjacent to the rear wall of a bed 16 is a recovery assembly 28, which includes a retractable towing assembly 30, a pair of side stabilizers 32, an anchor assembly 34 and winch cable rollers 36. A winch 38 which cooperates with cable rollers 36 is located forwardly of crane 12 on bed 16.

It is a particular feature of the present invention that the rearward mounting of the recovery assembly 28 enables a relatively large load 39, such as a tank engine, to be carried on the chassis. This enables a single vehicle to be used for an entire recovery operation including replacement of an engine.

Figure 2:
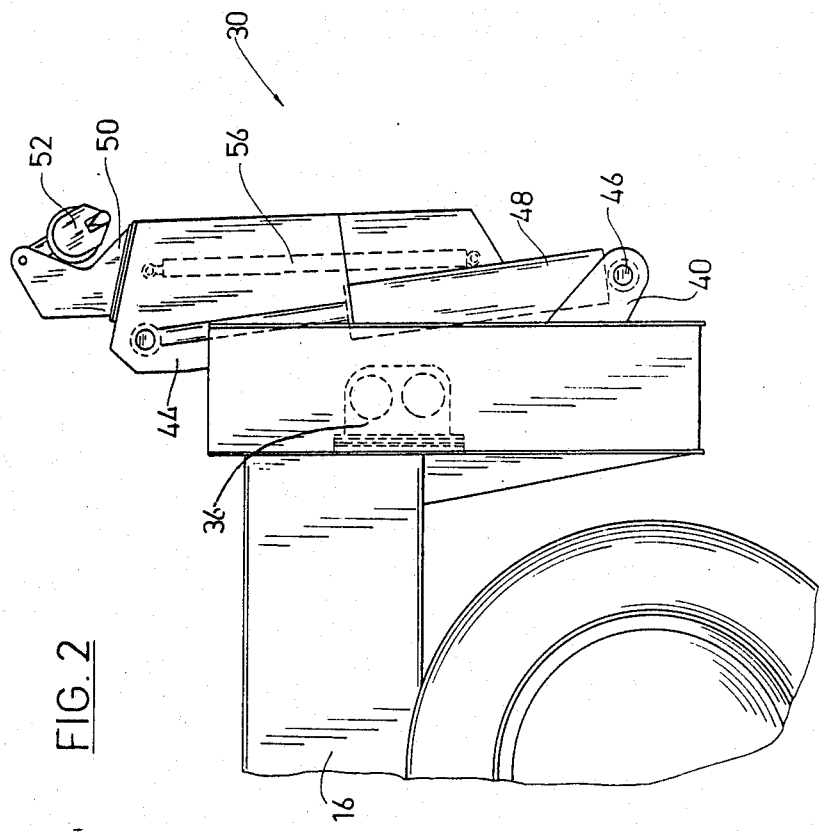
FIG. 2 is a side view illustration of the rear portion of the vehicle of FIG. 1 illustrating the winch cable rollers and the retractable towing assembly in its retracted orientation.
Figure 3:
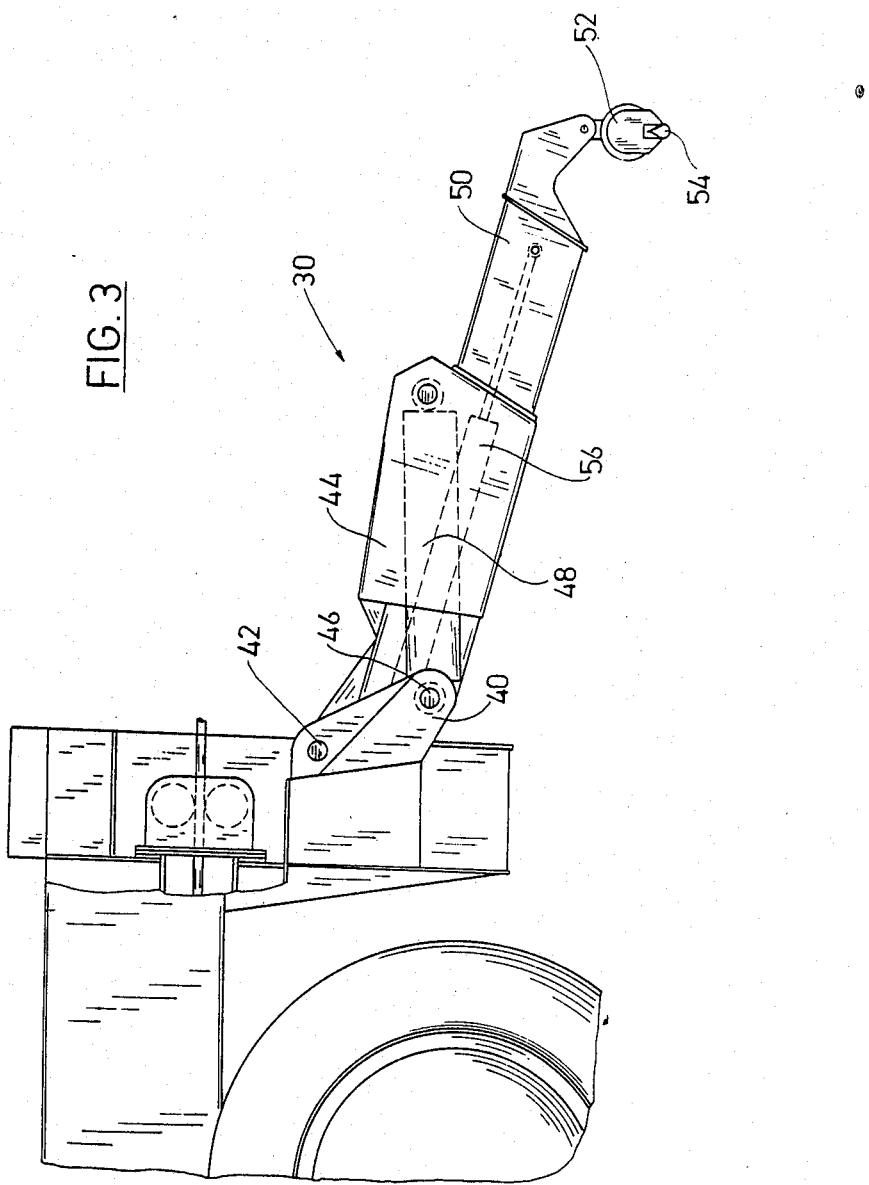
FIG. 3 is a side view illustration corresponding to FIG. 2 and illustrating the retractable towing assembly in its fully extended orientation.
Figure 4:
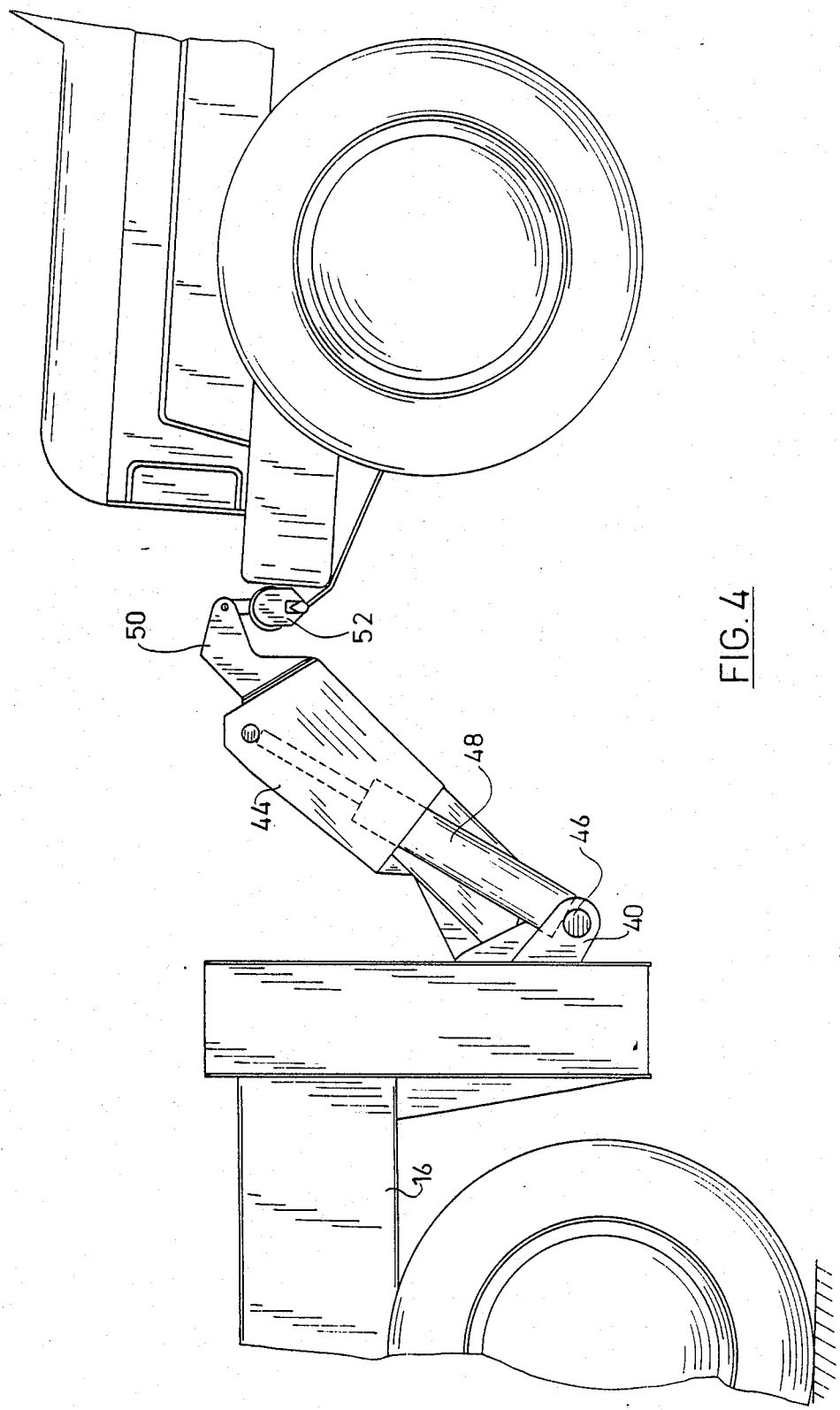
FIG. 4 is a side view illustration corresponding to FIGS. 2 and 3 and showing the retractable towing assembly in a raised towing orientation.

Reference is now made to FIGS. 2, 3, and 4, which illustrate the construction and operation of the retractable towing assembly 30 in greater detail. Towing assembly 30 comprises a base 40, which is typically welded onto the rear end of bed 16. Base 40 defines a first pivot axis 42 for pivotable mounting of an intermediate member 44. Base 40 also defines a second pivot axis 46 for pivotable mounting of a piston and cylinder combination 48 which determines the orientation of intermediate member 44 in a vertical plane.

Telescopically mounted with respect to intermediate member 44 is an extensible arm 50 onto which is pivotably mounted a towing bar 52 having associated side hooks 54. A piston and cylinder combination 56 determines the orientation of extensible arm 50 relative to intermediate member 44. FIG. 2 illustrates the towing assembly in a fully retracted orientation, when not in use, wherein piston 48 is extended and piston 56 is retracted.

FIG. 3 illustrates the towing assembly 30 in its extended orientation wherein piston 48 is retracted and piston 56 is extended prior to engagement with a vehicle to be towed. FIG. 4 illustrates the towing assembly in its towing orientation, wherein piston 48 is partially extended and piston 56 is fully retracted.

Figure 5:
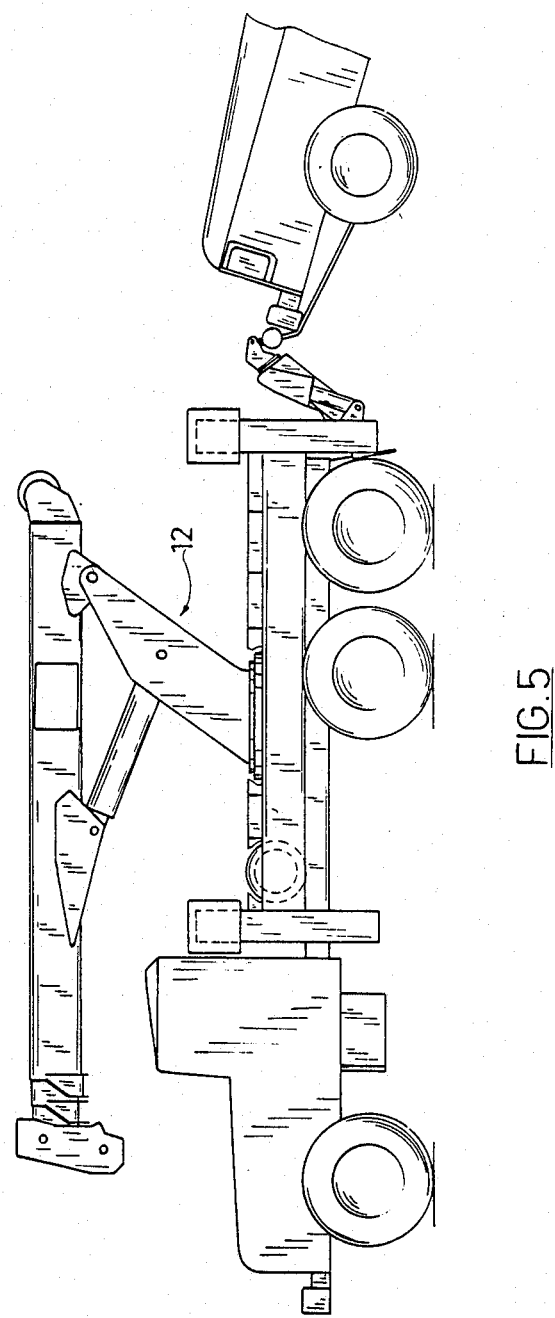
FIG. 5 is a side view illustration corresponding to FIG. 1 and showing the vehicle in a towing orientation.

Reference is now made to FIG. 5 which shows the vehicle of the present invention in a towing orientation. It is noted that the crane 12 is rotated to face forwardly to provide a counterbalance and to eliminate problems of clearance with the towed vehicle.

Figure 6:
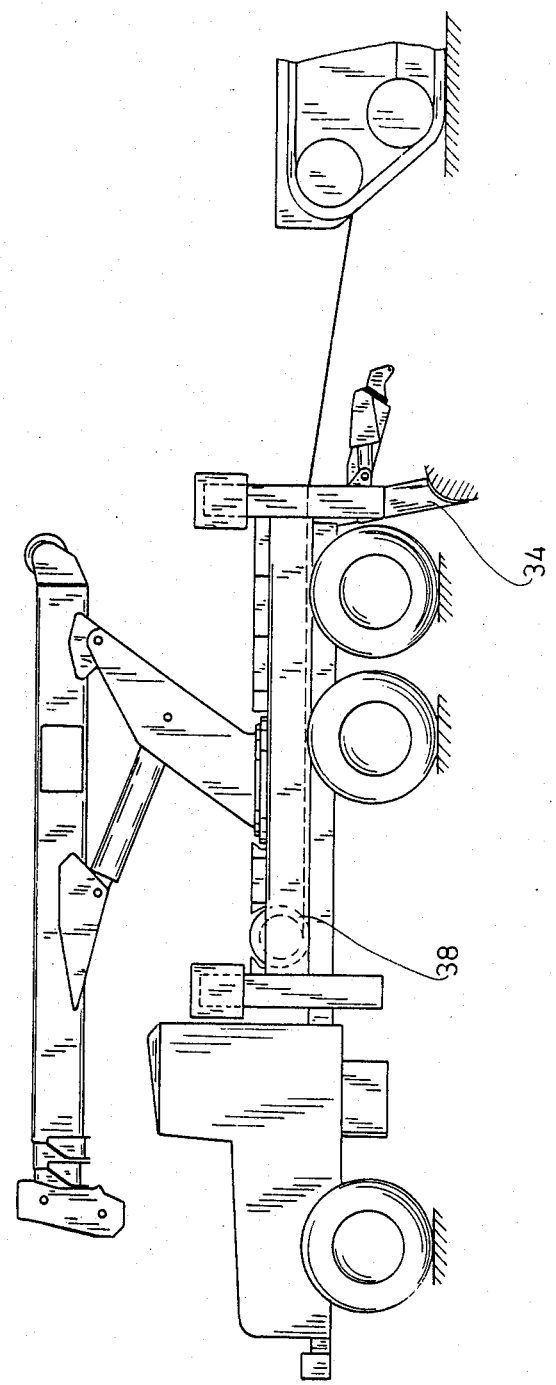
FIG. 6 is a side view illustration corresponding to FIG. 1 and showing the vehicle in a winch recovery orientation.

FIG. 6 shows the vehicle in a recovery orientation wherein the anchor assembly 34 is extended into ground engaging orientation and winch 38 is operated. FIG. 7 illustrates the vehicle in a loading orientation wherein stabilizers 32 are in extended operating orientation.

Reference is now made to FIGS. 8 and 9 which illustrate details of the construction of the recovery assembly 28 (Fig. 1). It is appreciated that the recovery assembly, as a unit, with the exception of the winch, is mounted at the back end of the chassis of a vehicle and does not require any space on the bed of the chassis, freeing this space for load carrying. If the forward direction is defined as facing the front of the vehicle and the rearward direction is defined as facing the rear of the vehicle, it may be appreciated that the anchor assembly 34 and its associated piston 60 (illustrated in phantom), are located forwardly of the retractable towing assembly 30, which has been described in detail hereinabove.

Stabilizers 32 are seen in FIG. 8 to be disposed to the two sides of the recovery assembly 28, the towing assembly 30 and the anchor assembly 34 being disposed therebetween. As seen most clearly in FIG. 3, the winch cable rollers are located forwardly of the towing assembly 30 and centrally with respect to the chassis.

It will be appreciated by persons skilled in the art that the present invention is not limited by what has been particularly shown and described hereinabove. Rather the scope of the present invention is defined only by the claims which follow:

I claim:

1. A multi-purpose integrated recovery vehicle comprising:
    a wheel mounted chassis defining a bed;
    a slewing crane mounted on said chassis; and
    a recovery assembly mounted at a rearward end of said chassis at a location which does not interfere with the operation of the crane,
    said recovery assembly comprising an extensible and retractable towing assembly, a retractable anchor assembly, and a retractable stabilizer assembly,
    said retractable towing assembly being mounted rearwardly and below said bed of said chassis and comprising a base mounted onto said chassis, an intermediate member pivotally mounted onto said base, a telescoping member extendibly mounted onto said intermediate member, a first piston extending between said base and said intermediate member for orienting said intermediate member and a second piston extending between said intermediate member and said telescoping member for orienting said telescoping member relative to said intermediate member, and
    said retractable anchor assembly being arranged forwardly of said retractable towing assembly.

2. A recovery vehicle according to claim 1 and wherein said crane and said recovery assembly are arranged on the chassis so as to leave a significant portion of the chassis available for carrying loads, such as a large vehicle engine.

3. A recovery vehicle according to claim 1 and wherein said crane comprises a 360 degree rotatable crane.

4. A recovery vehicle according to claim 2 and wherein said retractable stabilizer assembly includes first and second stabilizers arranged on either side of said retractable towing assembly

* * * * *